United States Patent [19]
Kumano et al.

[11] Patent Number: 6,100,347
[45] Date of Patent: Aug. 8, 2000

[54] CRYSTALLINE OLEFIN RESIN COMPOSITION

[75] Inventors: Yuuta Kumano; Osamu Nisizawa; Kenji Takasaki; Masato Onoe, all of Mie, Japan

[73] Assignee: Mitsubishi Chemical Corporation, Tokyo, Japan

[21] Appl. No.: 09/051,802

[22] PCT Filed: Oct. 23, 1998

[86] PCT No.: PCT/JP96/03086

§ 371 Date: Apr. 23, 1998

§ 102(e) Date: Apr. 23, 1998

[87] PCT Pub. No.: WO97/15622

PCT Pub. Date: May 1, 1997

[30] Foreign Application Priority Data

Oct. 23, 1995 [JP] Japan .................................. 7-274341

[51] Int. Cl.$^7$ .................................................. C08L 77/06
[52] U.S. Cl. ................................................... 525/435
[58] Field of Search ........................................ 525/435

[56] References Cited

FOREIGN PATENT DOCUMENTS 0 386 896  9/1990  European Pat. Off. .
0 765 909  4/1997  European Pat. Off. .

Primary Examiner—Terressa M. Boykin
Attorney, Agent, or Firm—Oblon, Spivak, McClelland, Maier & Neustadt, P.C.

[57] ABSTRACT

A crystalline olefin base resin composition having a high elastic modulus, a high heat resistance and excellent scratch resistance, and that is useful as a material for car parts and the like is provided. The crystalline olefin base resin composition described above comprises 99 to 40% by weight of the following component (A) and 1 to 60% by weight of the following component (B):

(A) a crystalline olefin base resin, and
(B) a polymer obtained by vinylene polymerization of cyclic olefin and having a weight-average molecular weight of not less than 1,000 and less than 10,000 and a glass transition point of from 140 to 400° C.

6 Claims, 2 Drawing Sheets

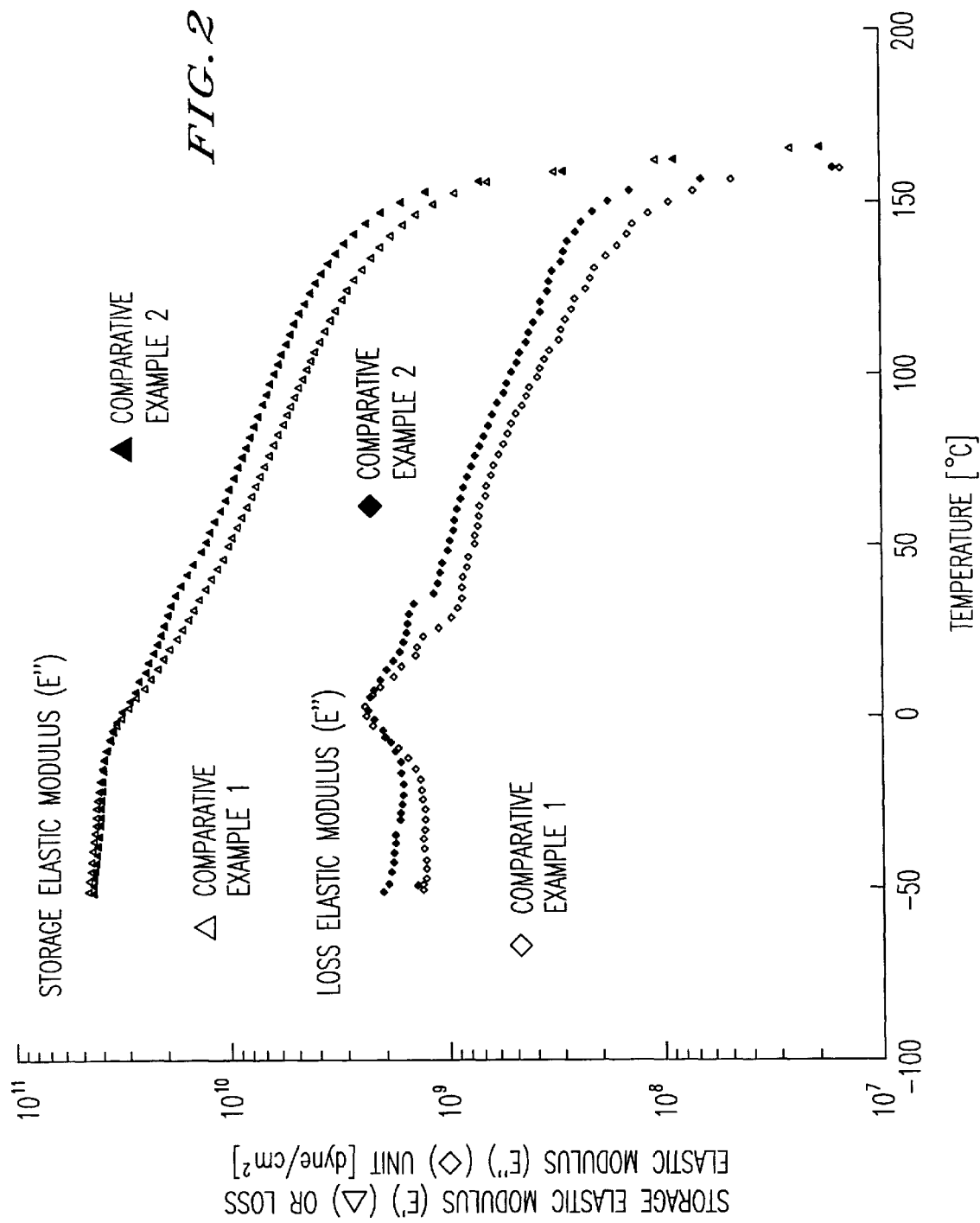

CRYSTALLINE OLEFIN RESIN COMPOSITION

FIELD OF THE INVENTION

The present invention relates to an olefin base resin composition that has excellent mechanical properties, scratch resistance, heat resistance and moldability. More specifically, it relates to a composition comprising a crystalline olefin base resin and a polymer prepared by vinylene polymerization of a cyclic olefin and having a high elastic modulus, heat resistance and surface hardness.

DESCRIPTION OF THE RELATED ART

Crystalline olefin base compositions such as polyethylene and polypropylene are widely used because of their good cost-performance balance. In order to satisfy performance requirements for various uses, raising their performances by methods such as blending a filler or an elastomer or polymer-alloying with engineering plastics has been attempted. In recent years, there has been a strong demand for an increase in the rigidity of the materials themselves in order to decrease the thicknesses of resin parts to achieve on accompanying reduction in weights thereof, particularly for car parts, for the purpose of improving fuel consumption. Further, an improvement in scratch resistance which is a weak point of olefin resins is required as well.

With conventional techniques, however, there have been the problems shown below.

That is, when a filler is blended with an olefin resin, although the rigidity thereof is increased while maintaining the characteristics of the olefin resin such as moldability and low specific gravity it the filler amount is small, the improvement in rigidity is limited. On the other hand, blending a large amount of a filler in order to raise the rigidity brings about a reduction in the flowability and moldability of the composition and not only damages the characteristics of the olefin resin, but also does not meet the goal of decreased weight due to an increase in the specific gravity. This has led to the requirement for improving the rigidity of the olefin resin itself which is a base.

Also, when alloying olefin resins with various engineering plastics, expensive engineering plastics have to be added in large quantities to obtain an increase in the rigidity, and a compatibility-accelerating agent (compatibiliser) is required in many cases. Accordingly, the characteristic of low cost accorded to olefin resins is canceled. Further, polar groups contained in engineering plastics and the compatibility-accelerating agents cause coloring of the compositions and, in certain cases, cancel the good hue accorded to olefin resins. In addition, the defect of scratching resistance still remains as long as olefin resins are the matrices.

Many studies have been made in which alicyclic oligomers such as a petroleum resin and a hydrogenated petroleum resin were added to olefin resins for the purposes of increasing elastic modulus and transparency (Japanese Patent Publication No. 41-7958, Japanese Patent Publication No. 49-30263, Japanese Patent Laid-open No. 47-22449, Japanese Patent Laid-open No. 50-116536, Japanese Patent Laid-open No. 55-86830 and Japanese Patent Laid-open No. 63-35642). In these compositions, however, while the elastic moduli are elevated at around room temperatures, the rigidities reduce suddenly at temperatures exceeding the glass transition points of the added alicyclic oligomers as low as 50 to 100° C., and the heat resistances accorded to olefin resins deteriorate to a large extent (refer to Comparative Examples 4 to 6).

Further, many studies have been made in which the copolymers of cyclic olefins with $\alpha$-olefins were blended with olefin resins to thereby improve the mechanical properties such as elastic modulus (Japanese Patent Laid-open No. 1-318052, Japanese Patent Laid-open No. 3-210348, Japanese Patent Laid-open No. 4-353540, Japanese Patent Laid-open No. 5-51413, Japanese Patent Laid-open No. 5-262898, Japanese Patent Laid-open No. 6-41361 and Japanese Patent Laid-open No. 6-316660). With these methods, however, the elastic moduli were elevated only at low rates, and improvement in the surface hardness was not observed (refer to Comparative Example 3).

In addition, many studies have been made as well in which the ring-opened polymers of cyclic olefins or the hydrogenated products thereof were blended with olefin resins to thereby improve mechanical properties such as elastic modulus and the like (Japanese Patent Laid-open No. 55-142036, Japanese Patent Laid-open No. 1-168751, Japanese Patent Laid-open No. 4-272937, Japanese Patent Laid-open No. 4-353540, Japanese Patent Laid-open No. 4-372635, Japanese Patent Laid-open No. 5-262898 and Japanese Patent Laid-open No. 6-316660). With the ring-opened polymers of cyclic olefins, however, double bonds were formed on the principal chains thereof, so that the heat resistances and the weather resistances thereof were deteriorated to a large degree. This necessitates hydrogenation of the double bonds to saturate them. However, because of one additional step in the production process, the complexity of the hydrogenating operation and the very expensive apparatus required from a safety point of view, the hydrogenation operation is expensive and therefore not preferable.

Further, Japanese Patent Laid-Open No. 4-272937 discloses improvement in the heat resistance, the transparency and the mechanical properties of a composite polymer sheet, comprising a crystalline polymer and a hydrogenated product of a ring-opened polymer of cyclic olefin, that has a low molecular weight and a glass transition point of 100° C. or higher. In general, however, the hydrogenated product of a ring-opened polymer having a low molecular weight has a glass transition point which is not very elevated. If the glass transition point thereof is not higher than the melting point of the crystalline olefin resin, the original high temperature heat resistance of the crystalline olefin resin is deteriorated. The hydrogenated product of the ring-opened polymer of cyclic olefin disclosed in the examples of the above Laid-Open has a molecular weight of 8000 and a glass transition point of 135° C. This glass transition point is not higher than the melting point of the crystalline olefin resin, and therefore a high temperature elastic modulus, which is one of the effects of the present invention, can not be achieved. On the other hand, if the molecular weight is increased in order to elevate the glass transition point, the molecular weight deviates from the range of the present invention in which the effects of the present invention are revealed, and therefore the effects of the present invention can not be obtained.

Further, Japanese Patent Laid-Open Patent No. 5-70655 discloses improvement in the dynamic properties, heat resistance, transparency and heat moldability of a composition prepared by mixing a thermoplastic resin with a norbornene polymer. However, the norbornene polymer disclosed here is a high molecular weight product and is of a different molecular weight range than the cyclic olefin polymer of the present invention. Naturally, the effects of the invention are different. For example, the rate of improvement of the elastic modulus was not as high in the norbornene polymer having a higher molecular weight as in the cyclic olefin polymer of the present invention (refer to Examples 1 to 4 and Comparative Example 2).

DISCLOSURE OF THE PRESENT INVENTION

Intensive research made by the present inventors in light of the problems described above have resulted in obtaining the knowledge that the problems described above can be solved by using a specific resin composition, thus culminating in the present invention.

That is, the present invention provides a crystalline olefin resin composition characterized by comprising 99 to 40% by weight of the following component (A) and 1 to 60% by weight of the following component (B):

(A) a crystalline olefin base resin, and
(B) a polymer obtained by vinylene polymerization of cyclic olefin and having a weight-average molecular weight of not less than 1,000 and less than 10,000 and a glass transition point from 140 to 400° C.

It was a very surprising discovery that the crystalline olefin base resin composition of the present invention reveals a high room temperature elastic modulus, scratch resistance and heat resistance, that could not have been anticipated from knowledge of conventional high molecular weight cyclic olefin polymer-blended alloys, by adding a cyclic olefin polymer having a specific structure and a specific molecular weight to a crystalline olefin base resin.

The reasons why such effects are revealed are not certain, but the following reason can be considered. When the cyclic olefin polymer prescribed in the present invention is added to the crystalline olefin base resin, the above cyclic olefin polymer is admixed together with an amorphous portion of the crystalline olefin base resin at molecular level because the above cyclic olefin polymer has a specific structure and a specific molecular weight. It is thought that this hardens the amorphous portion, which is originally soft and rubber-like and improves the originally inferior heat resistance, so that the effects of the present invention such as a high room temperature elastic modulus, scratch resistance and heat resistance, which could not be anticipated from past knowledge can be obtained.

The effects obtained in the present invention are thought to have a different expressing mechanism than those of the preceding filler blend and alloy with engineering plastic. Accordingly, it is thought that use of the resin composition of the present invention in combination with the filler blend and the alloy with engineering plastics provides higher performance without the damaging effects of the conventional techniques.

BRIEF DESCRIPTION OF THE DRAWINGS

FIG. 2 is a drawing showing a comparison of the temperature dependency of the storage elastic moduli (E') and the loss elastic moduli (E") in Comparative Example 1 and Comparative Example 2.

BEST MODE FOR CARRYING OUT THE INVENTION

Figure 1:
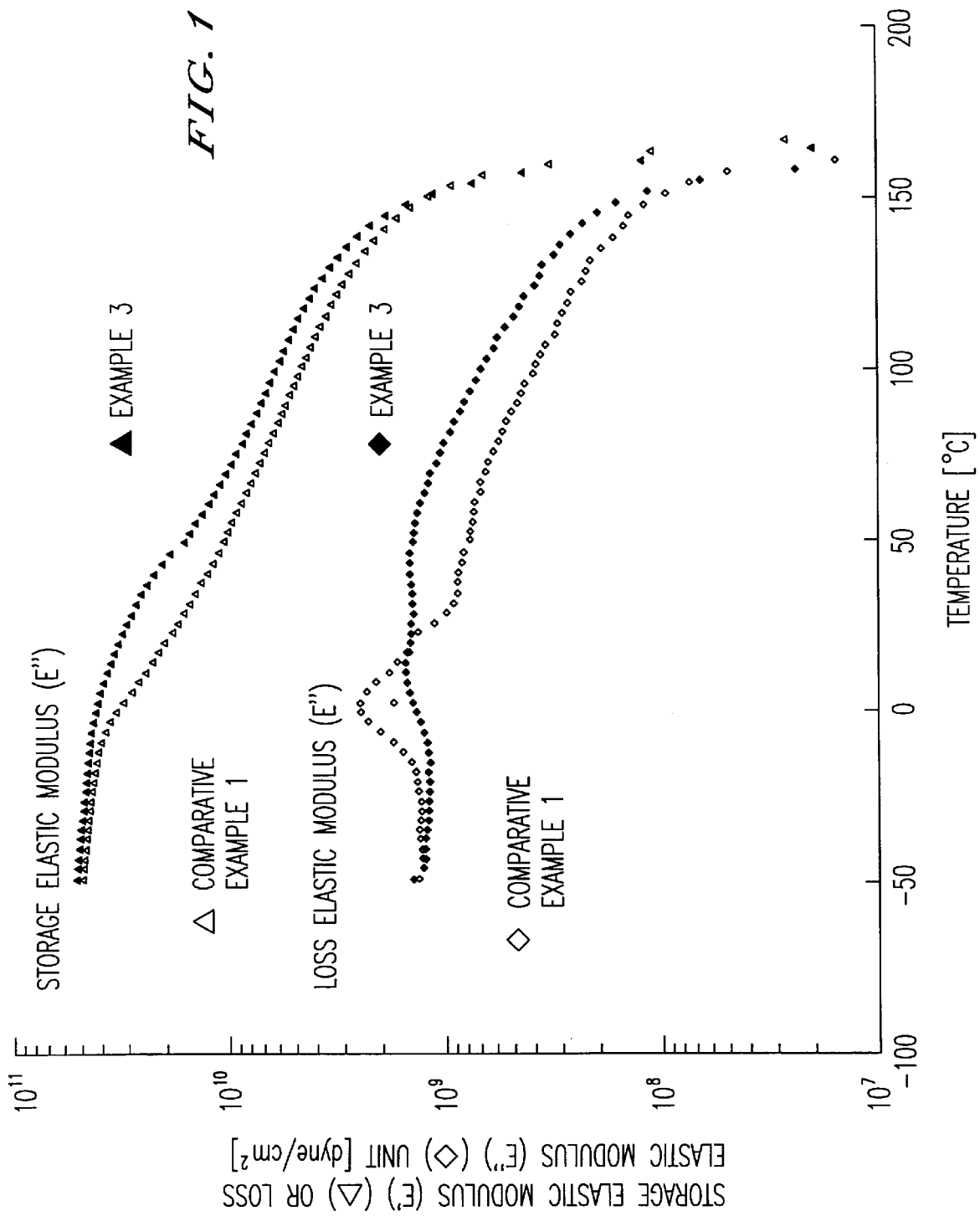
FIG. 1 is a drawing showing a comparison of the temperature dependency of the storage elastic moduli (E') and the loss elastic moduli (E") in Example 3 and Comparative Example 1.

[I] Crystalline Olefin Base Resin Composition
(1) Structural Somponents:

The crystalline olefin base resin composition of the present invention is fundamentally composed of the structural components shown below.
Component (A): Crystalline Olefin Base Resin The crystalline olefin base resin used in the present invention includes homopolymers of α-olefins such as ethylene, propylene, 1-butene, 3-methyl-1-butene, 4-methyl-1-pentene, 1-hexene and 1-pentene, copolymers of α-olefins, copolymers of the α-olefins described above with vinyl esters, copolymers of acrylic acid or the derivatives thereof and organic silicon compounds, and graft polymers of various unsaturated monomers with the above olefin resins.

These polymers have a crystallinity, calculated by the density method, of 20 to 100%, preferably 30 to 90% and more preferably 40 to 85%. They have a modulus of flexural elasticity, which is measured based on JIS-K7203, of 1,000 to 30,000 kg/cm$^2$, preferably 2,000 to 20,000 kg/cm$^2$ and more preferably 3,000 to 17,000 kg/cm$^2$. The melt flow rate (MFR) of the polymer described above is not specifically restricted, and the value thereof, determined at 230° C. and 2.16 kg based on ASTM-D1238, most suitably falls in a range of usually 0.001 to 200 g/10 minutes, preferably 0.01 to 100 g/10 minutes.

The crystalline olefin base resin described above includes, for example, polyethylene resins such as so-called low pressure polyethylene, medium pressure polyethylene, high pressure polyethylene and linear low density polyethylene, and stereospecific α-olefin resins such as stereospecific polypropylene, stereospecific poly-1-butene, stereospecific poly-3-methyl-1-butene and stereospecific poly-4-methyl-1-pentene. Among these crystalline olefin base resins, stereospecific propylene base resin (hereinafter described as the propylene resin) is preferred.

Homopolymers of propylene, or random or block copolymers of propylene with the α-olefins described above comprising 70 mole % or more, preferably 80 mole % or more of a propylene component are preferred as the propylene resin. Among these, polymers having a modulus of flexural elasticity, determined based on JIS-K7203, of 1,000 to 30,000 kg/cm$^2$, preferably 5,000 to 20,000 kg/cm$^2$ and more preferably 8,000 to 17,000 kg/cm$^2$ are suitable. The melt flow rate (MFR) of the polymers described above is not specifically restricted, and the value thereof, determined at 230° C. and 2.16 kg based on ASTM-D1238, most suitably falls in a range of usually 0.001 to 100 g/10 minutes, preferably 0.01 to 70 g/10 minutes.

Among these propylene resins, the propylene homopolymer is particularly preferred.

These propylene resins can be used alone or in a mixture of a plurality of types thereof. Usually, they can be used by suitably selecting them from commercially available resins.
Component (B): Cyclic Olefin Polymer The cyclic olefin polymer used in the present invention is a homopolymer prepared by vinylene polymerization of a single type of a cyclic olefin selected from among monocyclic olefins such as cyclobutenes, cyclopentenes and cyclohexenes, and polycyclic olefins such as norbornenes and tricyclo-3-decenes, or copolymers prepared by vinylene polymerization of plural kinds of cyclic olefins. The weight-average molecular weights thereof fall in a range of not less than 1,000 and less than 10,000, and the glass transition points thereof fall in a range of from 140 to 400° C.

Examples of cyclic olefins used as the monomer include monocyclic olefins including cyclobutene, cyclopentenes such as cyclopentene and 4-methylcyclopentene and cyclohexenes such as cyclohexene, 3-methylcyclohexene and 3-vinylcyclohexene, and polycyclic olefins including norbornenes such as norbornene, 1-methylnorbornene, 5-ethylidene-2-norbornene, methylenenorbornene, 5-vinyl-2-norbornene and 5-methylene-2-norbornene, tricyclo-3-decenes such as tricyclo[4,3,0,1$^{2.5}$]-3-decene and 2-methyltricyclo[4,3,0,1$^{2.5}$]-3-decene, dicyclopentadienes such as dicyclopentadiene-(tricyclo[4,3,0,1$^{2.5}$]-3,7-decadiene or tricyclo-[4,3,0,1$^{2.5}$]-3,8-decadiene) and 7-methyldicyclopentadiene, tetracyclo-3-dodecenes such as tetracyclo[4,4,0,1$^{2.5}$,1$^{7.10}$]-3-dodecene, 8-methyltetracyclo [4,4,0,1$^{2.5}$,1$^{7.10}$]-3-dodecene and 5,10-dimethyltetracyclo[4, 4,0,1$^{2.5}$,1$^{7.10}$]-3-dodecene, pentacyclopentadecenes such as pentacyclo-[6,5,1,1$^{3.6}$,0$^{2.7}$,0$^{9.13}$]-4-pentadecene, 10-methyl-pentacyclo[6,5,1,1$^{3.6}$,0$^{2.7}$,0$^{9.13}$]-4-pentadecene and pentacyclo[4,7,0,1$^{2.5}$,0$^{8.13}$,1$^{9.12}$]-3-pentadecene, pentacyclodecadienes such as pentacyclo-[6,5,1,1$^{3.6}$,0$^{2.7}$, 0$^{9.13}$]-4, 10-pentadecadiene and pentacyclo[6,5,1,1$^{3.6}$,0$^{2.7}$,0$^{9.13}$]-4, 11-pentadecadiene, and hexacyclo[6,6,1,1$^{3.6}$,1$^{10.13}$,0$^{2.7}$, 0$^{9.14}$]-4-heptadecenes.

The cyclic olefin polymer can be obtained by vinylene polymerization in which addition polymerization takes place via an ethylenically unsaturated bond of the cyclic olefin by using a specific organic transition metal compound and an organic aluminum oxy compound as catalyst components.

The polymerization method for the vinylene polymer of the cyclic olefin is not specifically restricted, and any conventional polymerization method, for example, slurry polymerization, vapor phase polymerization, block polymerization, solution polymerization and suspension polymerizationmay be used, but the slurry polymerization method, the solution polymerization method and the block polymerization method are most suitable. The polymerization method may be either a batch system or a continuous system.

The organic transition metal compound and the organic aluminum oxy compound, which are the structural components of the polymerization catalyst for the cyclic olefin polymer, may each be added separately to the polymerization system, regardless of the presence or absence of the monomers, to allow both to contact in the polymerization system to thereby form the catalyst system. Alternatively, the respective catalyst components may be contacted before adding them to the polymerization system to form the catalyst system, and then they may be introduced into the polymerization system. In this case, the order of contacting the respective catalyst components to form the catalyst system is not specifically restricted, and they can be added in any order.

The catalyst system can be formed by contacting the respective catalyst components in, for example, an inactive solvent under an inert gas atmosphere.

The following can be given as a suitable example of a catalyst for producing the cyclic olefin polymer of the present invention.

That is, the catalyst system comprising the catalyst component represented by either of the following two formulas and alumoxane may be suitably used:

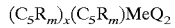

or

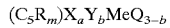

wherein Me is a transition metal of the fourth group, for example, Zr or Hf; each $(C_5R_m)$ is cyclopentadienyl or substituted cyclopentadienyl; each R may be the same or different and is selected from the group consisting of hydrogen, an alkyl, alkenyl, aryl, or an alkylaryl or arylalkyl group having 1 to 20 carbon atoms; X is an alkylene group having 1 to 4 carbon atoms or silicon for cross-linking two $(C_5R_m)$ rings or the $(C_5R_m)$ ring and Y; a is an integer of 0 to 4, and b is 0 or 1; when a is 0, b is 0; each Q may be the same or different and is an aryl, alkyl, alkenyl, alkylaryl or arylalkyl group having 1 to 20 carbon atoms, or halogen; Q is an alkylidene group having 1 to 20 carbon atoms; Y is an oxygen, nitrogen, phosphorus or sulfur atom; and m represents a number from 0 to 4.

When the cyclic olefin polymer of the present invention is prepared using the catalyst described above, a suitable amount of hydrogen can be added in order to obtain the polymer having a desired molecular weight.

The polymerization temperature usually falls in a range of −78 to 150° C., preferably −30 to 80° C. The amounts of the organic transition metal compound and the organic aluminum oxy compound used, which are the structural components for the catalyst system, are in a optional range for meeting the object of polymerisation. In the case of, for example, a solution polymerization system, the amount of organic transition metal compound used preferably falls in a range of 10$^{-7}$ to 10$^2$ millimole/liter, more preferably 10$^{-4}$ to 10 millimole/liter. The amount of the organic aluminum oxy compound used usually falls in a range of 10 to 100,000, more preferably 100 to 10,000 in terms of the mole ratio of aluminum/transition metal. The amount of the cyclic olefin used as a monomer usually falls in a range of 1 to 1,000,000, preferably 100 to 100,000 in terms of the mole ratio of the raw material monomers/the transition metal compound described above. The molecular weight of the polymer can be controlled by selecting the kinds and the amounts of the respective catalyst components to be used, the polymerization temperatures and the polymerization time or, by polymerization in the presence of hydrogen.

When a polymerization solvent is used, polymerization solvents which have so far been used in this kind of polymerization method, for example, halogenated hydrocarbons such as methylene chloride and 1,2-dichloroethane, aliphatic hydrocarbons such as pentane, hexane, heptane and octane, alicyclic hydrocarbons such as cyclopentane and cyclohexane, aromatic hydrocarbons such as benzene, toluene and xylene, petroleum fractions such as gasoline, kerosene and gas oil, and mixed solvents thereof can be used. Among these, aromatic hydrocarbons are particularly preferred.

The cyclic olefin polymer described above has a molecular weight falling in a range of not less than 1,000 and less than 10,000, preferably from 1,500 to 7,000 and more preferably from 2,000 to 5,000 in terms of a weight-average molecular weight (Mw) (reduced to polypropylene) determined by gel permeation chromatography (GPC). A Mw of less than 1,000 reduces the heat resistance of the crystalline olefin base resin and therefore is not preferred. On the other hand, a Mw of 10,000 or more does not allow the high elastic modulus and scratch resistance, which are the effects of the present invention, to be revealed and therefore is not preferred either.

The glass transition temperature of the cyclic olefin polymer described above, determined by a differential scanning type calorimeter, falls in a range of from 140 to 400° C., preferably from 160 to 350° C. and more preferably from 180 to 300° C. If it is lower than 140° C., the high elastic modulus, which is the effect of the present invention can not be obtained, and if it exceeds 400° C., the method for producing the resin composition of the present invention becomes complicated and therefore is not preferred.

Among these cyclic olefin polymers, the polycyclic olefin polymers comprising polycyclic olefins as principal monomer components suitably display the effects of the present invention and therefore are preferred.

An example of this structure includes a polymer represented by the following formula (1):

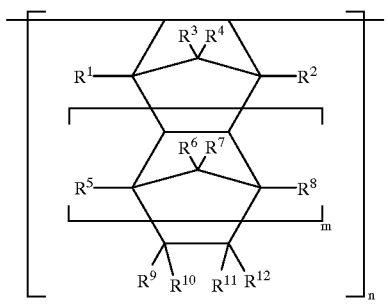

wherein $R^1$ to $R^{12}$ each independently represent a hydrogen atom, a hydrocarbon group having 1 to 20 carbon atoms or a substituent containing a halogen atom and the like; $R^9$ may be combined with $R^{11}$ or $R^{12}$ or $R^{11}$ with $R^{11}$ or $R^{12}$ to form a ring; m is an integer 0 or 1 or more; n is an integer of 1 or more; and in the polymer composed of the repetitive units represented by this formula, $R^1$ to $R^{12}$ and m in the respective repetitive units may be different from each other.

This polycyclic olefin polymer includes homopolymers of a single-type of polycyclic olefin, copolymers of a plural-type of polycyclic olefins and copolymers of polycyclic olefin and monocyclic olefin.

Of the polycyclic olefins used as the monomer, norbornenes are preferably used because the molecular weight is readily controlled in the polymerization and high polymerization activity is obtained.

Norbornene polymers using these norbornenes include homopolymers of a single-type of norbornene, copolymers of a plural-type of norbornenes and copolymers of norbornenes and other cyclic olefins.

Among these norbornene polymers, homopolymers of a single-type of norbornene, and copolymers of norbornenes and other cyclic olefins are preferred, and homopolymers of a single-type of norbornene are particularly preferred because of their high polymerization yield. These cyclic olefin polymers can be used alone or in a plural mixture thereof.

The cyclic olefin polymers described above may be copolymers with α-olefins such as ethylene and propylene, and aromatic vinyl compounds such as styrene and α-methylstyrene as long as the effects of the present invention are not notably damaged.

It is a matter of course that in the respective components (A) and (B) constituting the olefin base resin composition of the present invention, a combination of the preferred components described above is optimum.

Component (C): Additional Components

The olefin base resin composition of the present invention can contain the following additional components in addition to the components (A) and (B) described above as long as the effects of the present invention are not markedly damaged.

Elastomers can be the additional components described above. Elastomers are suitable since rigidity and the impact resistance can be controlled.

Both olefin base elastomers and styrene base elastomers can be used as the elastomers.

Copolymers of α-olefins such as ethylene, propylene, 1-butene and 1-hexene, copolymers thereof with non-conjugate dienes, and elastomeric polymers which are homopolymers of higher α-olefins such as 1-hexene and have a Mooney viscosity $ML_{1+4}$, measured at 100° C., falling in a usual range of 1 to 200, preferably 5 to 150 and more preferably 7 to 100 can be used as the olefin base elastomers. Among these olefin base elastomers, ethylene base elastomers and propylene base elastomers are particularly preferred in terms of quality and stability.

Concretely, they include ethylene propylene copolymerized rubber (EPM), ethylene/1-butene copolymerized rubber, ethylene/propylene/1-butene copolymerized rubber, ethylene/propylene/non-conjugate diene copolymerized rubber (EPDM), ethylene/1-butene/non-conjugate diene copolymerized rubber, and ethylene/propylene/1-butene/non-conjugate diene copolymerized rubber. Examples of the non-conjugate dienes described above include dicyclopentadiene, 1,4-hexadiene, cyclooctadiene, dicyclooctadiene, methylenenorbornene, 5-ethylidene-2-norbornene, 5-vinyl-2-norbornene, 5-methylene-2-norbornene, 5-methyl-1,4-hexadiene and 7-methyl-1,6-octadiene.

The styrene base elastomers include elastomeric random or block copolymers of styrene compounds such as styrene and α-methylstyrene with conjugate dienes such as 1,3-butadiene and isoprene, and hydrogenated products of these copolymers. Among these styrene base elastomers, the copolymers of the styrene compounds with the conjugate dienes are preferred, and among these block copolymers, those represented by the following formula (2) are the most suitable:

Formula (2)

$$(A-B)_{n+1} \text{ or}$$

$$A-(A-B)_n \text{ or}$$

$$B-(A-B)_{n+1} \text{ or}$$

wherein A represents a polymer block comprising a styrene compound; B represents a conjugate diene polymer block; n is an integer from 1 to 20; and the ratio of the A block to the entirety of molecules is 1 to 50% by weight.

These copolymers have a number-average molecular weight of 10,000 to 1,000,000,000, preferably 50,000 to 250,000,000.

Specific examples of these styrene base elastomers include styrene/conjugate diene block copolymers such as styrene/butadiene random copolymers, styrene/isoprene random copolymers, styrene/butadiene/styrene triblock copolymers, styrene/isoprene/styrene triblock copolymers, styrene/butadiene radial block copolymers having a polystyrene block at the terminal, styrene/isoprene radial block copolymers having a polystyrene block at the terminal, styrene/butadiene multi-block copolymers and styrene/isoprene multi-block copolymers, and hydrogenated products thereof. Among these styrene base elastomers, the hydrogenated styrene/conjugate diene block copolymers are preferred.

Of these elastomer components, the olefin base elastomers are more preferably used since the surfaces of the molded articles are not liable to be roughened.

Further, fillers can be the additional component in addition to the ones described above. Fillers are favorable because rigidity and dimensional stability can be controlled. Both inorganic filers and organic fillers can be used as the fillers. Their shape may be tabular, granular, spherical, fibrous or shapeless.

Concretely, they include: natural silica such as quartz, synthetic silica produced by a wet method or a dry method; natural silicates such as kaolin, mica, talc and asbestos; calcium silicate; synthetic silicates such as aluminum silicate; metal hydroxides such as magnesium hydroxide and aluminum hydroxide, metal oxide compounds such as alumina and titania; calcium carbonate; metal powders such as aluminum and bronze; wooden powder; carbon black; fibrous materials such as glass fiber, carbon fiber, aramide fiber and alumina fiber; high molecular liquid crystal substances; and whiskers such as potassium titanate whisker, magnesium sulfate whisker, aluminum borate whisker, calcium carbonate whisker, magnesium borate whisker, zinc oxide whisker, silicon carbide whisker, silicon nitride whisker, sapphire whisker and beryllia whisker.

Among these, mica, talc, calcium carbonate, potassium titanate whisker, magnesium sulfate whisker, aluminum borate whisker, calcium carbonate whisker and glass fiber are preferable, and mica, talc, potassium titanate whisker and magnesium sulfate whisker are particularly preferred.

These fillers may be subjected to surface treatment with surfactants and coupling agents. The fillers may be used alone or in combination of a plurality thereof. Various fillers can be used by selecting from commercially available products.

Further, addition agents (additives) can be other additional components (C), and specific examples thereof include: plasticizers or fluidity-improving agents such as paraffin oils and petroleum resins; softening agents such as olefin base liquid rubber and conjugate diene liquid rubber; colorants; antioxidants; neutralizing agents; light stabilizers; UV absorbers; anti-static agents; lubricants; nuclear agents; dispersion auxiliaries; molecular weight-controlling agents; cross-linking agents and flame retardants.

(2) Compounding Amount Ratio:

With respect to the compounding amount ratio of the preceding respective components constituting the resin composition of the present invention, the crystalline olefin base resin of component (A) falls in a usual range of 99 to 40% by weight, preferably 97 to 50% by weight and more preferably 95 to 60% by weight, and the cyclic olefin polymer of component (B) falls in a range of 1 to 60% by weight, preferably 3 to 50% by weight and more preferably 5 to 40% by weight, each based on the total weight of the crystalline olefin base resin of component (A) and the cyclic olefin polymer of component (B). If component (B) accounts for less than 1% by weight, the effects of the present invention are not displayed to a sufficient extent, and if it accounts for more than 60% by weight, the moldability of the composition itself is reduced.

(3) Mixing

The resin composition of the present invention is produced by mixing the respective structural components described above. The method for mixing these structural components is not specifically restricted, and a mixing method that employs melting by heat, a mixing method that employs dissolving in an arbitrary organic solvent and a mixing method that employs polymerizing may be used. Some of the methods described above may be used in combination.

In the mixing method that employs melting by heat, any conventional mixer such as, for example, a Brabender Plastograph, a single- or twin-screw extruder, a heavy duty screw mixer, a Banbury mixer, a kneader blender and a roll can be used.

The mixing method that employs dissolving in an arbitrary organic solvent includes a method in which the structural components described above are dissolved in an organic solvent at the same time, or solutions prepared by separately dissolving the respective structural components in an organic solvent are blended, and then the organic solvent is removed. Halogenated hydrocarbons such as methylene chloride and 1,2-dichloroethane, aliphatic hydrocarbons such as pentane, hexane, heptane and octane, alicyclic hydrocarbons such as cyclopentane and cyclohexane, aromatic hydrocarbons such as benzene, toluene and xylene, petroleum fractions such as gasoline, kerosene and gas oil, and mixed solvents thereof can be used as the organic solvent. Among these, aromatic hydrocarbons are particularly preferred. Examples thereof include aromatic hydrocarbons such as xylene and toluene, aliphatic hydrocarbons such as cyclohexane and decalin, and halogenated hydrocarbons such as chloroform and methylene chloride.

The mixing method that employs polymerizing includes a method in which polymerization solutions obtained by subjecting the respective structural components to solution polymerization are blended, and a two stage polymerizing method in which after polymerizing any one component, the other components are blended and then polymerized.

Examples of combining some of the methods described above include: a method in which mixing is carried out by dissolution in an organic solvent and after removing the solvent, kneading is further continued in a melted condition; a method in which the cyclic olefin polymer of the component (B), which is swollen by adding a small amount of an organic solvent, is added to the crystalline olefin base resin of the component (A) and the organic solvent is then removed while melting and blending the mixture; and a method in which the crystalline olefin base resin of the component (A) is polymerized in an organic solvent that dissolves the cyclic olefin polymer of the component (B).

[II] Molded Article of the Resin Composition

Various molding methods can be applied to the olefin base resin composition of the present invention, whereby the intended molded article can be obtained.

Molding can be carried out by a conventional method. That is, injection molding, injection-compression molding, gas injection, compression molding and extrusion molding (sheet molding, film molding, blow molding and pipe molding) may be used as a molding method.

Because of the good balance of mechanical properties and excellent scratch resistance, these molded articles can be used for various industrial parts, for example, exterior car parts such as bumpers, side moldings, wheel caps and spoilers, interior car parts such as instrument panels, levers, knobs and linings, electric appliances such as pots, cleaners, washing machines, refrigerators, lighting equipment and audio products, daily miscellaneous goods such as color boxes and storage cases, and packaging films.

EXAMPLES

The present invention will be explained below in further detail with reference to examples and comparative examples. The molding conditions for obtaining test samples from the resin compositions prepared in the respective examples and the test methods are shown below. "Parts" in the following examples means parts by weight. <Cyclic olefin polymer>

Polymerization Example 1

1 liter autoclave was charged with 450 ml of a toluene solution containing 10 g of norbornene ($C_7H_{10}$) and 51.3 ml of a toluene solution (concentration: 85 mg/ml) of polymethylalmoxane, and the mixture was stirred at 70° C. for 15 minutes. Then, 65.7 mg of cyclopentadienylzirconium trichloride was added to carry out polymerization at a polymerization temperature of 70° C. for 4 hours. The reaction mixture was added to a hydrochloric acid-acidic methanol to filter off precipitated white solid, and then washing with methanol was repeated until the washing solution became neutral. Then, the white solids (homopolymer of norbornene) thus obtained were dried under reduced pressure. The yield of the polymer was 5.5 g. The molecular weight was determined by GPC to find that Mw was 2000 and Mw/Mn was 1.28. Further, the glass transition point was measured by DSC to find that it was 180° C. It was found from measurement by $^{13}$C-NMR that the polymerization proceeded at random and that the cyclic structure was maintained. This is designated as Sample PNB (1).

Polymerization Example 2

The polymerizing operation was repeated under the same conditions as in Polymerization Example 1 to obtain white solids, except that the amount of norbornene charged was changed to 30 g. The yield was 25.3 g. The molecular weight was determined by GPC to find that Mw was 3200 and Mw/Mn was 1.51. Further, the glass transition point was measured by DSC to find that it was 210° C. It was found from measurement by $^{13}$C-NMR that the polymerization proceeded at random and that the cyclic structure was maintained. This is designated as Sample PNB (2).

Polymerization Example 3

The polymerizing operation was repeated under the same conditions as Polymerization Example 1 to obtain white solids, except that the amount of norbornene charged was changed to 50 g. The yield was 44.8 g. The molecular weight was determined by GPC to find that Mw was 4700 and Mw/Mn was 1.68. Further, the glass transition point was measured by DSC to find that it was 240° C. It was found from measurement by $^{13}$C-NMR that the polymerization proceeded at random and the cyclic structure was maintained. This is designated as Sample PNB (3).

Polymerization Example 4

The polymerizing operation was repeated under the same conditions as Polymerization Example 1 to obtain white solids, except that the amount of norbornene charged was changed to 50 g and 38.4 ml of a toluene solution (concentration: 113 mg/ml) of methylisobutylalmoxane, substituted for polymethylalmoxane, was used. The yield was 39.1 g. The molecular weight was determined by CPC to find that Mw was 45,000 and Mw/Mn was 2.13. In the measurement by DSC, the polymer started to decompose at temperatures lower than the glass transition point, and therefore the glass transition point could not be determined. This is designated as Sample PNB (4).

GPC measuring conditions

Equipment: GPC 150C manufactured by Waters Co., Ltd.,

Column: AD80M/S×3 manufactured by Showa Denko Co., Ltd.

Solvent: orthodichlorobenzene

Flow velocity: 1.0 ml/minute

IR: 3.42 $\mu$

Temperature: 140° C.

Concentration: 20 mg/ml

Injection amount: 200 $\mu$l

The weight-average molecular weight reduced to polypropylene was calculated GPC measurement under the conditions described above.

DSC measuring conditions

Equipment: DSC-SS5200 manufactured by Seiko Electron Co., Ltd.

Temperature-elevation rate: 20° C./minute

Sample amount: 10 mg Examples 1 to 11 and Comparative Examples 1 to 8

The respective components shown in Table 1 and Table 2 were dry-blended, or after dissolving the respective components in a xylene solvent at 140° C., they were precipitated in methanol, then filtered off and dried, whereby a preblended mixture was obtained. Then, the mixture thus obtained was kneaded by means of a labo plastomill kneader (manufactured by Toyo Seiki Seisakusho) under the conditions of 250° C., 50 rpm for 5 minutes and then crushed to thereby obtain a granulated composition. 4-methyl-2,6-di-t-butylphenol of 0.1 part by weight and Irganox 1010 (manufactured by Ciba Geigy Co., Ltd.) of 0.1 part by weight each per 100 parts by weight of the total amount of the respective components were added as stabilizers during melting and kneading.

Test pieces were injection-molded from the granulate composition thus obtained by means of a press molding or injection molding machine (Minimax CS183MMX manufactured by Custom Scientific Co., Ltd.) at 250° C. and a die-cooling temperature of 40° C. The physical properties thereof were determined and evaluated by the following methods. The results thereof are shown in Table 1 and Table 2.

(1) Storage Elastic Modulus

A test piece with a thickness of 2 mm prepared by press-molding at 250° C. was cut to a length of 50 mm and a width of 5 mm, and the temperature dependency of the storage elastic modulus (E') and the loss elastic modulus (E") was measured by means of a solid visco-elasticity measuring apparatus (RSAII manufactured by Leometric Far East Co., Ltd.) at a frequency of 1 Hz.

(2) Surface Hardness

A test piece having a length of 40 mm, a width of 30 mm and a thickness of 3 mm was prepared by injection molding to measure the Vickers hardness at its surface by means of a micro-hardness tester (MVK-F manufactured by Akashi Seisakusho Co., Ltd.).

(3) Izod Impact Strength

A test piece having a length of 31.5 mm, a width of 6.2 mm and a thickness of 3 mm was prepared by injection molding to measure the Izod impact strength with a notch having a head R of 0.25 mm and a depth of 1.2 mm by means of an Izod impact tester (Minimax model CS183TI manufactured by Custom Scientific Co., Ltd.) at 23° C.

The blendedcompositions shown in Table 1 and Table 2 were as follows:

Component (A): Olefin Base Resin

PP (1): propylene homopolymer having a bending elastic modulus of 11,900 kg/cm$^2$ which was measured based on JIS K7203 and an MRF of 0.6 g/10 minutes which was measured at 230° C. and 2.16 kg. The 23° C. storage elastic modulus which was measured by means of a solid visco-elasticity measuring apparatus was 1.78 Gpa.

PP (2): propylene homopolymer having a bending elastic modulus of 14,300 kg/cm$^2$ which was measured based on JIS K7203 and an MRF of 15 g/10 minutes which was measured at 230° C. and 2.16 kg. The 23° C. storage elastic modulus which was measured by means of the solid visco-elasticity measuring apparatus was 1.90 Gpa.

PP (3): propylene ethylene copolymer having a bending elastic modulus of 16,200 kg/cm$^2$ which was measured based on JIS K7203, an MRF of 30 g/10 minutes which was measured at 230° C. and 2.16 kg and an ethylene content of 4% by weight. The 23° C. storage elastic modulus which was measured by means of the solid visco-elasticity measuring apparatus was 2.06 Gpa.

Component (B): Cyclic Olefin Polymer

PNB (1): norbornene homopolymer produced in Polymerization Example 1 and having a molecular weight Mw of 2000 with a Mw/Mn of 1.28 which was determined by GPC and a glass transition point of 180° C. which was determined by DSC.

PNB (2): norbornene homopolymer produced in Polymerization Example 2 and having a molecular weight Mw of 3200 with a Mw/Mn of 1.51 which was determined by GPC and a glass transition point of 210° C. which was determined by DSC.

PNB (3): norbornene homopolymer produced in Polymerization Example 3 and having a molecular weight Mw of 4700 with a Mw/Mn of 1.68 which was determined by GPC and a glass transition point of 240° C. which was determined by DSC. Comparative components PNB (4): norbornene homopolymer produced in Polymerization Example 4 and having a molecular weight Mw of 45,000 with a Mw/Mn of 2.13 which was determined by GPC.

Ethylene-cyclic olefin copolymer:

ethylene-tetracyclo[4,4,0,1$^{2,5}$, 1$^{7,10}$]-3-dodecene random copolymer which was polymerized according to the method described in Japanese Patent Laid-open No. 61-168708 and had an ethylene content of 62 mole %, a molecular weight Mw of 53,000 with a Mw/Mn of 2.21 which was determined by GPC and a glass transition point of 159° C. which was determined by DSC.

Petroleum resin (1): Escorez 5320 manufactured by Exxon Chemical Japan Co., Ltd. and having a Mw of 600, Mn of 340 and a glass transition point of 70° C.

Petroleum resin (2): Alcon P140 manufactured by Arakawa Chemical Co., Ltd. and having a Mw of 870 and a glass transition point of 71° C.

TABLE 2

|  | Example 8 | C.Ex.* 9 | Example 7 | Example 10 | Example 11 | C.Ex. 8 |
|---|---|---|---|---|---|---|
| Olefin base resin |  |  |  |  |  |  |
| PP(1) |  |  |  |  |  |  |
| PP(2) | 80 | 80 | 100 |  |  |  |
| PP(3) |  |  |  | 80 | 80 | 100 |
| Cyclic olefin polymer |  |  |  |  |  |  |
| PNB(1) |  |  |  | 20 |  |  |
| PNB(2) | 20 | 20 |  |  | 20 |  |
| PNB(3) |  |  |  |  |  |  |
| Comparative sample |  |  |  |  |  |  |
| PNB(4) |  |  |  |  |  |  |
| Ethylene/cyclic olefin copolymer |  |  |  |  |  |  |
| Petroleum resin(1) |  |  |  |  |  |  |
| Petroleum resin(2) |  |  |  |  |  |  |
| Method for preblending | dry | sol* | — | dry | dry | — |
| E' (GPa) |  |  |  |  |  |  |
| 23° C. | 3.08 | 3.22 | 1.90 | 2.69 | 2.51 | 2.06 |
| 100° C. | 0.77 | 0.77 | 0.56 | 0.65 | 0.73 | 0.67 |
| 150° C. | 0.22 | 0.21 | 0.17 | 0.14 | 0.23 | 0.22 |
| Surface hardness (kgf/mm$^2$) | 9.06 | 9.83 | 7.77 | 8.92 | 8.25 | 5.95 |
| Izod (kg · cm/cm$^2$) | 3.1 | 2.8 | — | 3.2 | 3.0 | — |

*C.Ex.: Comparative Example
sol: solution

It can be seen from the results shown in Table 1 that the resin compositions of the present invention have, to a large extent, improved elastic moduli at around room temperature as compared with that of Comparative Example 1. It can be

TABLE 1

|  | Example |  |  |  |  |  |  | Comparative Example |  |  |  |  |  |
|---|---|---|---|---|---|---|---|---|---|---|---|---|---|
|  | 1 | 2 | 3 | 4 | 5 | 6 | 7 | 1 | 2 | 3 | 4 | 5 | 6 |
| Olefin base resin |  |  |  |  |  |  |  |  |  |  |  |  |  |
| PP(1) | 80 | 80 | 80 | 80 | 90 | 70 | 60 | 100 | 80 | 80 | 80 | 80 | 80 |
| PP(2) |  |  |  |  |  |  |  |  |  |  |  |  |  |
| PP(3) |  |  |  |  |  |  |  |  |  |  |  |  |  |
| Cyclic olefin polymer |  |  |  |  |  |  |  |  |  |  |  |  |  |
| PNB(1) | 20 |  |  |  |  |  |  |  |  |  |  |  |  |
| PNB(2) |  | 20 | 20 |  | 10 | 30 | 40 |  |  |  |  |  |  |
| PNB(3) |  |  |  | 20 |  |  |  |  |  |  |  |  |  |
| Comparative sample |  |  |  |  |  |  |  |  |  |  |  |  |  |
| PNB(4) |  |  |  |  |  |  |  |  | 20 |  |  |  |  |
| Ethylene/cyclic olefin copolymer |  |  |  |  |  |  |  |  |  | 20 |  |  |  |
| Petroleum resin(1) |  |  |  |  |  |  |  |  |  |  | 20 | 20 |  |
| Petroleum resin(2) |  |  |  |  |  |  |  |  |  |  |  |  | 20 |
| Method for preblending | dry | dry | sol* | dry | dry | dry | dry | — | sol | dry | dry | sol | dry |
| E' (GPa) |  |  |  |  |  |  |  |  |  |  |  |  |  |
| 23° C. | 2.91 | 2.89 | 3.02 | 2.78 | 2.78 | 2.97 | 3.09 | 1.76 | 2.14 | 2.12 | 2.59 | 2.57 | 2.97 |
| 100° C. | 0.49 | 0.53 | 0.58 | 0.63 | 0.56 | 0.68 | 0.81 | 0.43 | 0.61 | 0.64 | 0.19 | 0.26 | 0.22 |
| 150° C. | 0.06 | 0.10 | 0.11 | 0.14 | 0.12 | 0.13 | 0.13 | 0.09 | 0.16 | 0.11 | 0.03 | 0.05 | 0.04 |
| Surface hardness (kgf/mm$^2$) | 9.25 | 9.18 | 9.20 | 8.00 | 8.90 | 9.22 | 9.25 | 7.23 | 7.20 | 7.25 | 10.7 | 10.1 | 10.0 |
| Izod (kg · cm/cm$^2$) | 3.3 | 3.6 | 3.1 | 3.0 | 3.6 | 2.6 | 2.5 | — | 3.1 | 3.4 | 3.2 | 3.2 | 3.4 |

*sol: solution seen as well that the elastic moduli at high temperatures are equivalent to or higher than that of non-modified polypropylene and that the heat resistances are maintained or improved as well. Further, it can be seen that the surface hardnesses are elevated as well.

In contrast with this, the addition of the cyclic olefin polymers prepared in Comparative Examples 2 and 3 having high molecular weights provide only a small effect for improving the room temperature elastic moduli and do not improve the surface hardnesses.

Further, in the system shown in Comparative Examples 4, 5 and 6, in which the petroleum resins were added, both the room temperature elastic moduli and the surface hardnesses were improved, but the elastic moduli at high temperatures are notably reduced and the heat resistances are lowered to a large degree.

It can be seen from the results shown in Table 2 that similar effects can be obtained by changing the type of polypropylene as well.

A comparison of Example 3 with Comparative Example 1 with regards to the temperature dependency of the storage elastic moduli (E') and the loss elastic moduli (E") is shown in FIG. 1, and a similar comparison of Comparative Example 1 with Comparative Example 2 is shown in FIG. 2.

As previously described, it can be seen from a comparison of the storage elastic moduli shown in FIG. 1 that the resin composition of the present invention has an improved elastic modulus as compared with that of Comparative Example 1. Further, it can be seen from the comparison of the loss elastic moduli that a peak, originating at the glass transition point of the propylene base resin, is observed at around 0° C. in Comparative Example 1, but this peak is widely shifted to a higher temperature and flattened in the resin composition of the present invention. This indicates that the added cyclic olefin polymer having a specific structure and a specific molecular weight is admixed together with an amorphous portion contained in the propylene base resin at the a molecular level.

It can be seen from the results shown in FIG. 2 that the effect of improving the elastic modulus is low in Comparative Example 2. Further, a shifting and flattening of the peak in the loss elastic modulus is not observed, and therefore it is suspected that the added cyclic olefin polymer having a high molecular weight is not admixed together with the amorphous portion contained in the propylene resin and is present in the form of a domain as is the case with conventional polymer alloys.

INDUSTRIAL APPLICABILITY

The crystalline olefin base resin composition of the present invention, which is prepared by adding the cyclic olefin polymer having a specific structure and a specific molecular weight to the crystalline olefin base resin, shows a high room temperature elastic modulus and an excellent scratch and heat resistance which could not be anticipated from knowledge of conventional compositions, and is useful as a material for car parts and the like.

Further, the effects obtained in the present invention are considered to be different in their expressing mechanism from those of conventional filler blends and alloys with engineering plastics. Accordingly, the use of the resin composition of the present invention in combination with the filler blends and the alloys with engineering plastics can provide a higher performance without damaging the effects of conventional techniques.

What is claimed is:

1. A crystalline olefin base resin composition comprising 99 to 40% by weight of the following component (A) and 1 to 60% by weight of the following component (B):
    (A) a crystalline olefin base resin, and
    (B) a polymer obtained by vinylene polymerization of cyclic olefin selected from the group consisting of a homopolymer of a cyclic olefin and a copolymer of a plurality of cyclic olefins, and having a weight-average molecular weight, measured by Gel Permeation Chromatography and reduced to polypropylene, of not less than 1000 and less than 10,000 and a glass transition point of from 140 to 400° C.

2. The resin composition as described in claim 1, wherein the crystalline olefin base resin is a homopolymer of propylene, or a random or block copolymer of propylene with an other α-olefin.

3. The resin composition as described in claim 1, wherein the polymer obtained by vinylene polymerization of cyclic olefin is a polycyclic olefin polymer.

4. The resin composition as described in claim 1, wherein the cyclic olefin polymer is admixed together with an amorphous portion contained in the crystalline olefin base resin at molecular level.

5. The resin composition as described in claim 3, wherein the polycyclic olefin polymer is a norbornene base polymer.

6. The resin composition as described in claim 5, wherein the norbornene base polymer is a homopolymer of a single norbornene.

* * * * *

UNITED STATES PATENT AND TRADEMARK OFFICE
CERTIFICATE OF CORRECTION

PATENT NO. : 6,100,347

DATED : August 8, 2000

INVENTOR(S): Yuuta KUMANO, et al.

It is certified that an error appears in the above-identified patent and that said Letters Patent is hereby corrected as shown below:

On the Title Page, Item [22] the PCT Filing Date is incorrect in the Letters Patent. It should read as follows:

[22] PCT Filed: Oct. 23, 1996

Signed and Sealed this

Seventeenth Day of April, 2001

Attest:

NICHOLAS P. GODICI

*Attesting Officer*   *Acting Director of the United States Patent and Trademark Office*